US011100252B1

(12) United States Patent
Enuka et al.

(10) Patent No.: US 11,100,252 B1
(45) Date of Patent: Aug. 24, 2021

(54) MACHINE LEARNING SYSTEMS AND METHODS FOR PREDICTING PERSONAL INFORMATION USING FILE METADATA

(71) Applicant: BigID Inc., New York, NY (US)

(72) Inventors: Yehoshua Enuka, Gimzo (IL); Nimrod Vax, Tel Aviv (IL); Eyal Sacharov, Herzliya (IL)

(73) Assignee: BigID Inc., New York, NY (US)

( * ) Notice: Subject to any disclaimer, the term of this patent is extended or adjusted under 35 U.S.C. 154(b) by 0 days.

(21) Appl. No.: 17/178,057

(22) Filed: Feb. 17, 2021

Related U.S. Application Data

(60) Provisional application No. 62/977,693, filed on Feb. 17, 2020.

(51) Int. Cl.
*H04L 9/00* (2006.01)
*G06F 21/62* (2013.01)
*G06F 16/35* (2019.01)
*G06N 5/04* (2006.01)
*G06N 20/00* (2019.01)

(52) U.S. Cl.
CPC ........ *G06F 21/6245* (2013.01); *G06F 16/353* (2019.01); *G06N 5/04* (2013.01); *G06N 20/00* (2019.01)

(58) Field of Classification Search
CPC ..... G06F 21/6245; G06F 16/353; G06N 5/04; G06N 20/00
See application file for complete search history.

(56) References Cited

U.S. PATENT DOCUMENTS

| | | | |
|---|---|---|---|
| 10,223,368 B2* | 3/2019 | Bhosale | G06F 3/0649 |
| 10,395,058 B1* | 8/2019 | Kothavale | G06F 21/6245 |
| 2010/0235313 A1* | 9/2010 | Rea | G06F 16/335 706/52 |
| 2015/0242707 A1* | 8/2015 | Wilf | G06K 9/6256 382/159 |
| 2018/0012143 A1* | 1/2018 | Hansen | G06Q 10/00 |
| 2019/0138946 A1* | 5/2019 | Asher | G06N 20/20 |
| 2020/0372338 A1* | 11/2020 | Woods, Jr. | G06Q 10/063112 |

* cited by examiner

*Primary Examiner* — Beemnet W Dada
(74) *Attorney, Agent, or Firm* — Zeller IP Group, PLLC; Kyle M. Zeller

(57) ABSTRACT

Systems, methods and apparatuses are disclosed to efficiently and accurately scan a plurality of documents located in any number of unstructured data sources. Preprocessed metadata is generated for each document and metadata features are determined based on the preprocessed metadata. A trained machine learning system may utilize the metadata features to predict whether each of the documents contains personal information, without requiring any information relating to the content of such documents.

20 Claims, 5 Drawing Sheets

MACHINE LEARNING SYSTEMS AND METHODS FOR PREDICTING PERSONAL INFORMATION USING FILE METADATA

CROSS-REFERENCE TO RELATED APPLICATIONS

The present application claims the benefit of priority to U.S. provisional patent application Ser. No. 62/977,693, titled "Machine Learning Systems and Methods for Predicting Personal Information Using File Metadata," filed Feb. 17, 2020, which is incorporated by reference herein in its entirety.

BACKGROUND

Although a number of software solutions exist to allow organizations to identify and protect personal information stored in structured files and databases, such solutions are not applicable to unstructured content, such as documents (e.g., text files, word processing documents, presentations, etc.) stored in file shares, personal computing devices, content management systems and various other internal and external systems. Unfortunately, unstructured data is ubiquitous in today's business environment, as such data may be generated using many applications, stored in any number of file formats, and may include nearly unlimited form and content.

In many cases, unstructured file shares are simply too large to allow for efficient scanning of their complete contents. Although sampling combined with intelligent correlation algorithms has been shown to efficiently yield high-resolution mappings of personal information distributed across structured data stores, the same methodology is not suitable for unstructured data due to its inherent complexity.

There is thus a need for systems and methods that employ advanced scanning techniques to accurately determine high-resolution mappings of personal information distributed across unstructured data stores. Due to the enormous size and complexity of typical "Big Data" file shares, it would be beneficial if such solutions were designed to be highly efficient in terms of computation time and memory requirements.

SUMMARY

In accordance with the foregoing objectives and others, exemplary embodiments are disclosed herein that provide for efficient and accurate scanning of unstructured data stores. The embodiments are adapted to scan unstructured file systems to determine a high-resolution mapping of personal information distributed in such systems, in significantly less time than is otherwise required by conventional scanning algorithms.

Unlike conventional scanning solutions for unstructured data, which require parsing entire contents of large numbers of documents, the embodiments may generate a map of personal information distribution using only document metadata. The embodiments may employ machine learning models to automatically discover hidden patterns of correlation between personal information presence in documents and metadata associated with such files. That is, the machine learning models employed by the various embodiments may be trained to accurately predict whether unstructured documents contain personal information based only on the metadata associated with the document (i.e., without information about the content of the document).

In one aspect of the embodiments, a computer-implemented method of predicting personal information presence in unstructured data is provided. The method may include receiving, for each of a plurality of documents associated with unstructured data and stored in a data source, metadata information including a plurality of metadata items, such as a document path and/or a document name. The method may further include preprocessing, for each of the documents, the respective metadata information to generate preprocessed metadata, where the preprocessing includes: for each metadata item of the plurality of metadata items, normalizing the metadata item to generate a normalized metadata item and/or tokenizing the normalized metadata item to generate a tokenized metadata item including a plurality of tokens. The method may also include creating, for each of the documents, metadata features based on the respective preprocessed metadata, such as by calculating, for each of the tokenized metadata items, a total number of occurrences of each token of the plurality of tokens. Additionally, the method may include creating, for each of the documents, a data record with the respective metadata features; providing the data records to a trained machine learning system that has previously been trained with training data to determine personal information predictions based only on the metadata features of the data records, each personal information prediction relating to a probability that a document associated with a given data record contains personal information; receiving, from the trained machine learning system, a personal information prediction for each of the documents; and displaying the personal information predictions.

In another aspect of the embodiments, a machine-readable medium having program instructions stored thereon is provided. The instructions may be capable of execution by a processor and may define a plurality of steps that include receiving, for each of a plurality of documents associated with unstructured data and stored in a data source, metadata information including a plurality of metadata items, such as a document path and/or a document name. The steps may further include preprocessing, for each of the documents, the respective metadata information to generate preprocessed metadata, where the preprocessing includes: for each metadata item of the plurality of metadata items, normalizing the metadata item to generate a normalized metadata item and/or tokenizing the normalized metadata item to generate a tokenized metadata item including a plurality of tokens. The steps may also include creating, for each of the documents, metadata features based on the respective preprocessed metadata, such as by calculating, for each of the tokenized metadata items, a total number of occurrences of each token of the plurality of tokens. Additionally, the steps may include creating, for each of the documents, a data record with the respective metadata features; providing the data records to a trained machine learning system that has previously been trained with training data to determine personal information predictions based only on the metadata features of the data records, each personal information prediction relating to a probability that a document associated with a given data record contains personal information; receiving, from the trained machine learning system, a personal information prediction for each of the documents; and displaying the personal information predictions.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
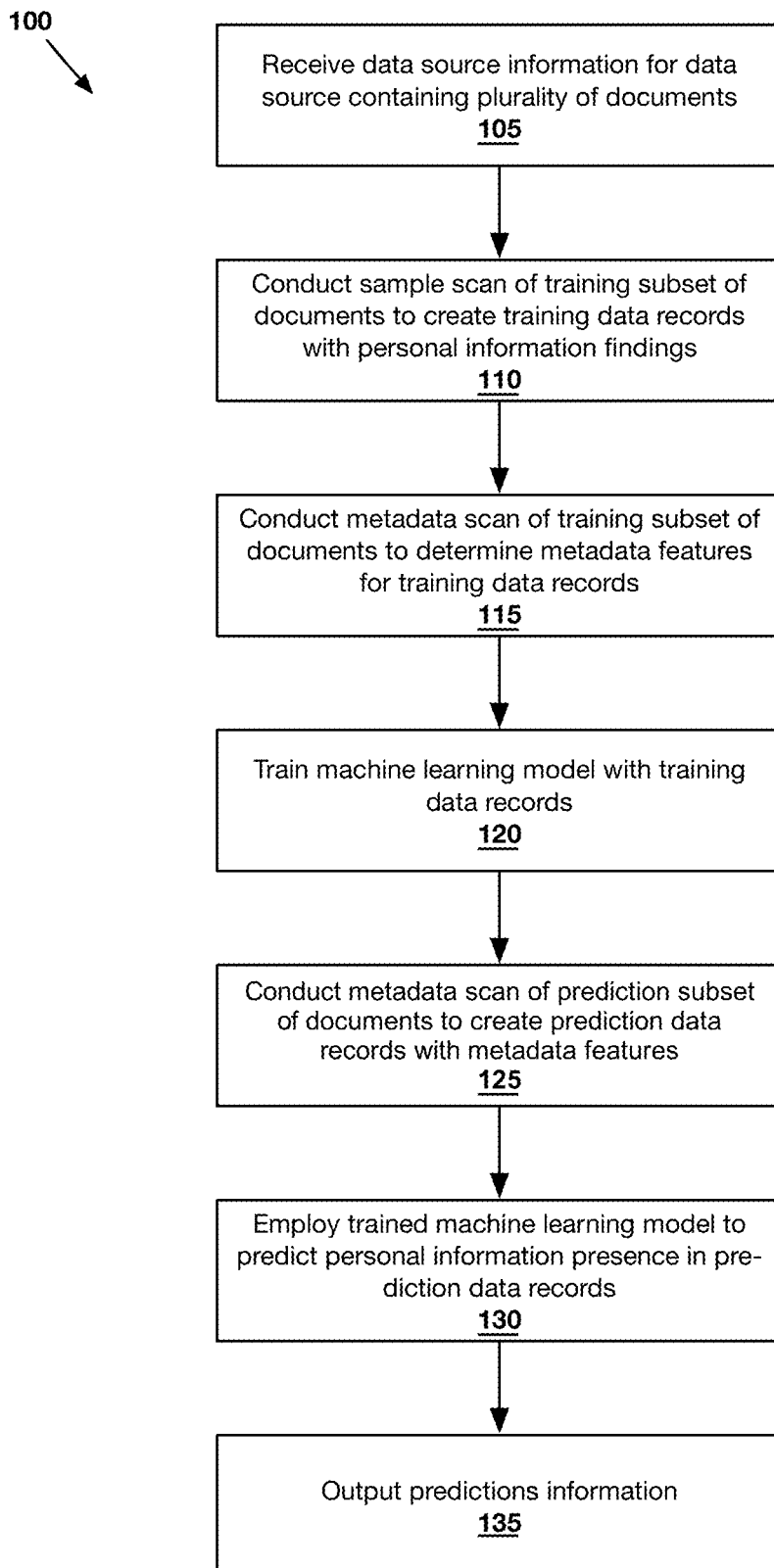
FIG. 1 shows an exemplary method of predicting personal information presence in a plurality of documents stored in an unstructured data source.

Various systems, computer-implemented methods, apparatuses and software applications are disclosed that employ machine learning techniques to efficiently and accurately predict the presence of personal information in documents stored in unstructured data sources based solely on metadata associated with such documents. The embodiments presented herein significantly reduce the overall scan time required to discover and map personal information throughout unstructured data sources. Moreover, the special handling of the metadata features employed by the embodiments allows for hidden patterns to emerge such that correlation between metadata and personal information presence may be quantified.

As used herein, the term "personal information" ("PI") may refer to any information or data that can be used on its own or with other information to identify, contact, or locate a single person, and/or to identify an individual in context. Such information may include any information that can be used to distinguish or trace an individual's identity. Specific, non-limiting examples of personal information include, but are not limited to: name, home address, work address, email address, national identification number, social security number, passport number, driver's license number, age, gender, race, name of school attended, workplace name, grades, salary, job position, criminal record, web cookies, vehicle registration plate number, facial images or features, fingerprints, handwriting, IP address, credit card numbers, digital identity, login name, screen name, nickname, user handle, telephone number, date of birth, birthplace, and/or other genetic information.

Because of the versatility and power of modern re-identification algorithms, the absence of defined personal information does not mean that the remaining data does not identify individuals. While some attributes may be uniquely identifying on their own, any attribute can be identifying in combination with others. Accordingly, personal information may include any other information that is linked or linkable to an individual, such as medical information, personal health information ("PHI"), educational information, financial information, payment card industry ("PCI") data, employment information and/or other so-called "quasi-identifiers" or "pseudo-identifiers." Personal information may include information defined as "Personal Data" in Europe, or "Personally Identifiable Information," "PII" or "Sensitive Personal Information" (and other variants thereof) in the United States.

The term "document" is used herein to refer to any object, file, document, sequence, data segment, etc. comprising unstructured or semi-structured data. Exemplary documents may include, but are not limited to, text documents, word processing files (e.g., Microsoft Word™ documents), PDF files, spreadsheets (e.g., Microsoft Excel™ spreadsheets), presentations (e.g., Microsoft PowerPoint™ presentations), email messages, text messages, instant messages, social media posts, images, videos and/or audio files.

Generally, documents may comprise or otherwise be represented by document information including content and associated metadata. Document content may include, for example, characters, words, sequences, symbols, etc.

Document metadata comprises information about the document itself. Exemplary document metadata may include, but is not limited to: document name, document type or extension, document location or path (i.e., a unique location within a file system), document size, date created, date modified, date last opened, tags, author, custodian, recipient, copyees, assignee, signatories, party names, audience, brand, language, personal identity information present, word count, page count, source, tone/sentiment, security level, attachment range, hash value, signature date, effective date, and/or expiration date.

The disclosed embodiments may employ machine learning models that utilize features relating to document metadata to predict the presence of personal information contained in documents. The embodiments may evaluate such features for any number of documents to determine the likelihood that each document contains personal information and/or to determine the likelihood that each document contains a specific personal information attribute. The embodiments may also be adapted to output prediction information in the form of various reports, alerts and/or notifications.

It will be appreciated that the term "machine learning" generally refers to algorithms that give a computer the ability to learn without being explicitly programmed, including algorithms that learn from and make predictions about data. Machine learning algorithms employed by the embodiments disclosed herein may include, but are not limited to, random forest ("RF"), clustering, logistic regression, decision tree learning, Bayesian networks, support vector machines ("SVMs"), artificial neural networks ("ANN"), deep neural networks ("DNN"), support vector machines, rule-based machine learning, and/or others.

For clarity, algorithms such as linear regression or logistic regression can be used as part of a machine learning process. However, it will be understood that using linear regression or another algorithm as part of a machine learning process is distinct from performing a statistical analysis such as regression with a spreadsheet program. Whereas statistical modeling relies on finding relationships between variables (e.g., mathematical equations) to predict an outcome, a machine learning process may continually update model parameters and adjust a classifier as new data becomes available, without relying on explicit or rules-based programming.

Overview

Referring to FIG. 1, an exemplary method 100 of predicting the presence of personal information in documents associated with an unstructured data source is illustrated. As shown, the method begins at step 105, where the system receives and/or determines data source information corresponding to one or more data sources containing documents.

In one embodiment, the system may receive data source information from an application. For example, a user may manually enter data source information into a client application and/or may upload a file containing such information.

In another embodiment, the system may be configured to automatically discover one or more data sources, along with any corresponding data source information. Exemplary data source information may comprise, for example, a name, location, type and/or access information of the data source.

Exemplary unstructured data sources employed with the embodiments discussed herein may include unstructured or semi-structured file shares, such as those associated with local and cloud storage systems, collaboration tools, customer relationship management ("CRM") systems, data protection solutions, document management systems, ecommerce systems, human resources systems, user directories (e.g., Lightweight Directory Access Protocol ("LDAP")) and/or other internal or external applications. Some specific unstructured data sources include, but are not limited to, Microsoft Office 365, Microsoft SharePoint, Microsoft OneDrive, Box, Google Workspace, Google Drive, Amazon Web Services ("AWS") S3, Dropbox, Apple iCloud, NetApp, Dell EMC, Hadoopo Distributed File System ("HDFS").

In any event, the system may connect to a data source based on the determined and/or received data source information in order to access documents contained therein. In one embodiment, the documents may be accessed over an internal and/or external network, the Internet, or the like.

At step 110, the system may conduct a sample scan of a training subset of documents contained in the data source to create training data records with personal information findings. Generally, the training subset is used to train the personal information prediction machine learning model and may comprise data records corresponding to from about 1% to about 10% of the total number of documents stored in the data source. In one embodiment, the data records (and, thus, the documents corresponding thereto) may be randomly assigned to the training subset.

As explained in detail below with reference to FIG. 2, a sample scan may be employed to label training data records according to personal information classification and/or correlation. Accordingly, when combined with metadata scan results (discussed below), the training data records may be employed to train a machine learning system to accurately predict whether certain documents contain personal information using only document metadata.

At step 115, the system may conduct a metadata scan of the documents in the training subset to retrieve associated metadata and generate metadata features based on such information. As explained in detail below with reference to FIG. 3, various processing steps are performed to clean, validate and/or normalize retrieved metadata in order to create metadata features that may be included in training data record and used to train the personal information prediction machine learning model.

At step 120, the training data records comprising the sample scan results and the metadata scan results are employed to train a machine learning model such that it may predict personal information presence in documents associated with the unstructured data source.

In one embodiment, a user may input various model information into the system to configure the machine learning model. Exemplary model information may include, but is not limited to, a target variable or outcome for which predictions are to be made (i.e., presence of personal information), training data to be employed by the model (i.e., training data records comprising metadata features) and transformation or activation function information (discussed below).

Generally, the "learning" or "training" of a machine learning model refers to altering or changing model parameters to improve the overall predictive performance of the model. Determining the specific parameters w to be used in a model is an example of the more general problem of learning a mapping from data. Given a training data set D comprising a number N of examples of pairs of input and corresponding output observations (i.e., $D=\{(x_1, y_1) \ldots, (x_N, y_N)\}$), the goal is to learn a mapping that approximates the mapping on the training set and, importantly, that also generalizes and/or extrapolates well to unseen test data drawn from the same probability distribution as the pairs in the training data set D.

To learn such a mapping, an error function is defined to measure the positive utility (in the case of an objective function) or the negative utility (in the case of a loss function) of a mapping that provides an output y' from input x when the desired output is y. When the error function is a loss function, the error on a given training dataset may be defined for a mapping as the sum of the losses (i.e., empirical loss).

Many error functions may be employed to train the disclosed machine learning models, including functions that include regularization terms that prevent overfitting to the training data, functions derived from likelihoods or posteriors of probabilistic models, functions that are based on sub-sampling large data sets, or other approximations to the loss function of interest (so called "surrogate loss functions"). Generally, the error may be computed either on the entire training data or may be approximated by computing the error on a small sub-sample (or mini-batch) of the training data.

Training generally occurs based on some example data D, by optimizing the error function E using an optimization algorithm. For example, the error function can be minimized by starting from some initial parameter values w. and then taking partial derivatives of E(w,D) with respect to the parameters w and adjusting w in the direction given by these derivatives (e.g., according to the steepest descent optimization algorithm). It will be appreciated that any number of optimization algorithms may be employed to train the disclosed machine learning models, including, for example, the use of stochastic gradients, variable adaptive step-sizes, second-order derivatives, approximations thereof and/or combinations thereof.

In any event, once the model is trained, it may be employed to predict personal information presence of additional documents contained in the data source (i.e., a prediction subset of documents). Accordingly, at step 125 one or more additional metadata scans may be conducted to create prediction data records comprising metadata features.

At step 130 the trained machine learning model may be employed to generate prediction information for the prediction data records. In one embodiment, the prediction information may comprise a likelihood (i.e., probability) that a document contains personal information (e.g., any personal information, one or more particular personal information attributes, etc.). In another embodiment, the prediction information may comprise a document classification corresponding to a particular personal information attribute predicted by the system to be contained within a document.

Finally, at step 135, the system may transmit or output the prediction information corresponding to one or more prediction data records. For example, the system may display the predictive results and any corresponding document information (e.g., document name, document path, etc.) to a user via a client application.

As another example, the system may display aggregated prediction information. In one such case, the system may display aggregated prediction information in via a graphical user interface ("GUI") element, such as a heat map. The heat map may provide the number of documents containing personal information in the data source, along with a breakdown of the personal information attribute(s) contained in such documents.

As yet another example, the system may employ the prediction information to generate one or more document clusters. Generally, a document cluster will comprise a coherent, logical grouping of documents according to their predicted content. In one particular embodiment, the hybrid, dynamic file clustering algorithms discussed in U.S. patent application Ser. No. 16/710,089, titled "DYNAMIC DOCUMENT CLUSTERING AND KEYWORD EXTRACTION," filed Dec. 11, 2019 (incorporated by reference herein in its entirety) may be employed. Such methods may be employed to cluster documents without previous knowledge of the total number of desired clusters and may be employed in parallel to document scanning functions.

It will be appreciated that the configuration and content of unstructured file systems will vary widely from organization to organization, and, therefore, the metadata features that are correlated to presence of personal information will also vary across systems. Accordingly, in one embodiment, the machine learning model may be separately and automatically trained (e.g., on-site) for each unstructured data environment in which a model is to be deployed.

It will be further appreciated that the system may employ one or more machine learning algorithms to predict personal information presence. Because various machine learning algorithms provide different results for different types of data, it may be preferable to continuously compare the results obtained by different machine learning algorithms on various data sources within a single organization and/or across multiple organizations to determine variance. To that end, the system may test training data and validate a plurality of algorithms to select the most effective for a particular data set and/or organization.

The above approach provides high-performance prediction of personal information presence in documents based solely on associated metadata. By basing predictions off document metadata, rather than document content, the disclosed embodiments dramatically reduced the scan time required to generate high-resolution mappings of personal information distribution.

Sample Scan Method

Figure 2:
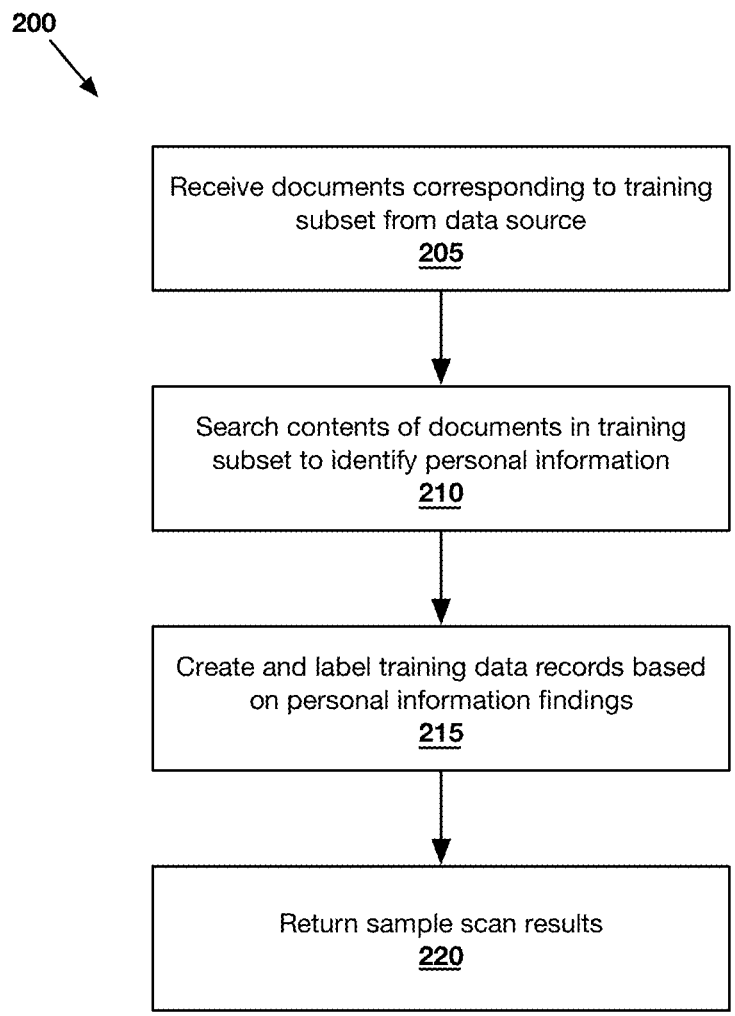
FIG. 2 shows an exemplary sample scan method according to an embodiment.

Referring to FIG. 2, an exemplary sample scan method 200 is illustrated. In certain embodiments, the system may employ one or more sampling methods to scan a subset (or sample) of the documents present in a data source. Such sample scan techniques may provide a statistically-valid survey of the locations where personal information is stored, while significantly reducing search times and strain on the system. Moreover, as explained below, sample scan results may be combined with metadata scan results to create training data for a personal information prediction machine learning system.

Scanning data sources for personal information can be a lengthy operation, as a typical search includes such steps as: scanning all data present in a given data source (e.g., a table, collection, and/or file), fetching the data into a scanner, and then determining whether the data constitutes personal information (e.g., by checking the data against a personal information index). Generally, the employed sample scan techniques are designed to maximize the probability of locating personal information, while maintaining a reasonably small sample size in order to reduce the amount of data that needs to be fetched and processed and the total time required to perform the search.

As shown in FIG. 2, at a first step 205, the system selects and retrieves a number of documents from a data source constituting a training subset. The number of documents to retrieve may be predetermined or may be calculated by the system based on the total number of documents in the data source. For example, the system may retrieve from about 5% to about 20% of the documents for sample searching (e.g., about 5%, about 10%, about 15% or about 20%). In one embodiment, the system may randomly select the documents to create the training subset.

At step 210, the system searches some or all of the retrieved documents in order to discover personal information contained therein. It will be appreciated that, due to the variable nature of unstructured data, the system may search all content of each document or may search only a portion of each document, as desired or required.

In one embodiment, the system may identify personal information by searching document content for matches of search patterns, such as regular expressions ("regex"). Generally, one or more regex classifiers may be employed, where each classifier corresponds to a particular personal information attribute (e.g., email addresses, postal codes, social security numbers, etc.).

It will be appreciated that, if inaccurate data (e.g., poor quality classifiers or attribute matches) is used to train the machine learning algorithm, the resulting model will be of low value. Accordingly, the regex classifiers used in the process should yield highly accurate matches with only a small fraction of false positives and false negatives.

In one embodiment, the system may employ one or more of the methods described in U.S. patent application Ser. No. 15/626,258, titled "Systems and Methods for Privacy Management," filed Jun. 19, 2017 (incorporated by reference herein in its entirety) to identify personal information in a document. As discussed therein, the system may employ various personal information rules, such as but not limited to: definition rules mapping to a unique identifier, a display name, country of resident attributes to be associated with specific personal information attributes (e.g., social security numbers or phone numbers) and/or combinations of such attributes. The personal information rules may further comprise one or more proximity rules governing searches within nearby locations of any found personal information attributes. For example, if a personal information attribute, such as a zip code, appears close to a social security number (e.g., in the same database row or within a certain number of characters), the system can correlate this proximity finding to a data subject associated with the given social security number.

Additionally or alternatively, the system may utilize attribute rules corresponding to the definition of personal information specified by one or more organizations, such as the definition(s) given by NIST Special Publication 800-122 (US) and/or General Data Protection Regulation (EU), both of which are incorporated by reference herein in their entirety. The system may be adapted to allow users to manually create and/or update personal information rules. And exemplary systems may implement machine learning or similar techniques to iteratively and/or continuously create and update such rules.

In another embodiment, the system may additionally or alternatively search the selected documents for personal information comprising entity source attributes. US Pat.

App. Pub. No. 2020/0050966, titled "Machine Learning System and Methods for Determining Confidence Levels of Personal Information Findings," filed Aug. 13, 2019 (incorporated by reference herein in its entirety) discloses an exemplary method of correlating potential personal information found in a data source (i.e., personal information findings) to data subject profiles. The system conducts a sample scan to identify potential personal information findings and associated metadata (e.g., one or more of: an attribute type, a value, a scan ID, data source information corresponding to the data source where the personal information is stored and/or location information corresponding to a location within the data source where the personal information is stored). The system then attempts to correlate each of the potential personal information findings to an entity data source attribute.

It will be appreciated that, for the personal information prediction machine learning model to perform well, the sample scan must output accurate results (i.e., high recall and precision). Generally, this requirement dictates that the entity source attributes should not be sampled, as a scan that is based on a sample will produce a large number of false negatives.

At step 215, the system creates training data records for the scanned documents based on the personal information findings. In one embodiment, the system may associate a label or other indicator with each of the training data records to indicate whether the system has classified such records as a personal information attribute (i.e., a specific type of personal information determined to be included within the content of the corresponding document).

At step 220, the system may store, transmit and/or display some or all of the sample scan results via one or more client applications and/or application programming interfaces ("APIs"). For example, the system may store each of the training data records with associated personal information findings, metadata associated with such findings, and/or labels. In cases where a document is classified as containing particular personal information, the system may further associate a personal information record created for one or more data subjects to whom the entry has been correlated. The sample scan results may include scan metadata, such as but not limited to: data source information corresponding to the data source(s) that were scanned, the number of documents scanned, the specific documents scanned, the number of personal information findings detected, correlated personal information and/or other information.

It will be appreciated that one of the first steps in creating a machine learning model is to prepare a labeled dataset. One of the advantages of the above sample scan method is that it does not require a user to manually label training data; such labeling is automatically performed by the discovery system (e.g., classification or entity source attribute correlation). The automatically labeled training data records may thus be employed in the training phase of the machine learning algorithm where the algorithm learns which metadata features to use in the decision process.

Metadata Scan Method

Figure 3:
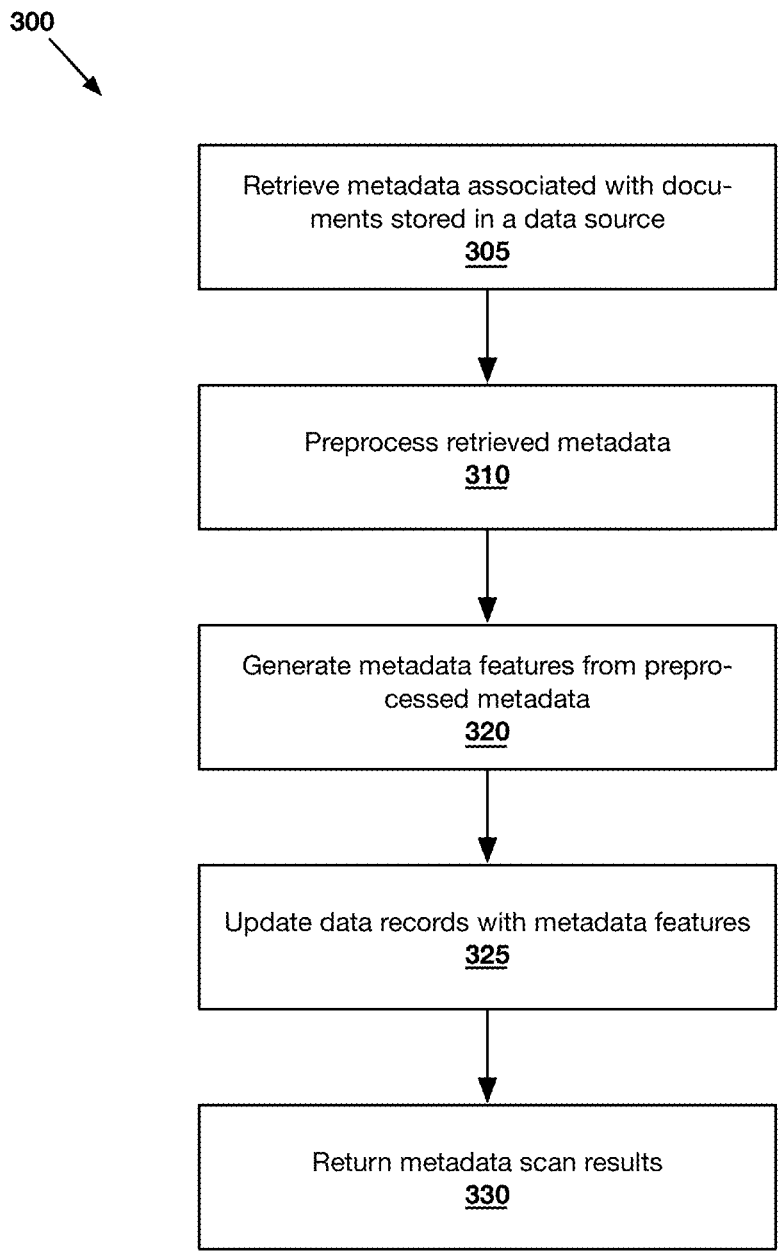
FIG. 3 shows an exemplary metadata scan method according to an embodiment.

Referring to FIG. 3, an exemplary metadata scan method 300 is illustrated. As shown, the method generally comprises scanning an unstructured data source to retrieve document metadata 305, preprocessing the retrieved metadata 310, and generating metadata features from the preprocessed metadata 320.

At step 305, a scanner scans an unstructured data source to locate documents stored therein. As documents are discovered in the data source, the system may retrieve and store metadata associated with such documents for preprocessing.

At step 310, the retrieved metadata is preprocessed. A basic requirement for using machine learning models is that every feature must be converted to a numerical representation. As discussed below, various methods may be employed to enable such conversion. It will be appreciated that the system may preprocess metadata for each document individually and/or may preprocess batches of document metadata.

It has surprisingly been found that useful metadata features for predicting the presence of personal information in documents may include, but are not limited to, those that relate to: document path, document size; document type (e.g. WORD document, EXCEL sheet, PDF file, etc.); document creation and/or modification dates; document owner; document author; document title, document keywords, document subject and/or document description.

Generally, preprocessing of metadata comprising natural language text (e.g., document path, document description, document title, document keywords and/or document subject) may include normalizing and tokenizing the metadata via one or more of: transforming metadata text to lowercase; removing various characters and/or patterns of characters; splitting metadata text into words, removing stop words; and/or applying word stemming or lemmatization.

In one embodiment, the system may first transform metadata text to lowercase and remove various characters, such as non-word characters, digits, punctuation and/or symbols. As an example, the system may transform the string, "openingThekitchen/cupboard 9!" into "openingthekitchencupboard."

The system may also split long strings of characters into underlying words. In certain embodiments, the system may employ dynamic programming to infer the position of the spaces. In one such case, the system may use a dictionary comprising words organized according to relative frequency. The system may break the string into potential combinations of valid words (i.e., words in the dictionary), calculate a "cost" for each potential combination based on the relative frequency of each word therein (where infrequently used words are associated with larger cost), and determine an optimal combination that minimizes the total cost.

As an example, the system may split the above string ("openingthekitchencupboard") into the following potential combinations of words based on a given dictionary: (1) "opening", "the", "kitchen", "cup" and "board"; and (2) "opening", "the", "kitchen" and "cupboard". In order to select the optimal combination, the system first determines the cost of each word in the first combination based on the relative frequency of the given word in the dictionary employed. The system may determine a total cost of the first combination by aggregating the individual word costs. The system may similarly calculate a total cost of the second combination. And the system may select the optimized combination (e.g., the second combination) by comparing the total cost of the first combination to the total cost of the second combination and selecting the combination having a lower total cost.

Finally, the system may optionally reduce words to their respective roots (e.g., parts of words common to all variants of that word). In this way, words with the same root may be grouped as the same word stem in downstream processing steps. Taking the above example, the word "opening" may be reduced to "open" to create the following normalized tokens: "open", "the", "kitchen" and "cupboard."

It will be appreciated that, in some embodiments, the system may remove one or more stop words from the generated words. Stop words may include parts of speech (e.g., articles, copulas, prepositions, etc.) and/or other common terms that do not contribute to characterization of the text (e.g., "the," "we," "Inc.," etc.). Taking the above example, the system may remove the term "the" to leave: "open", "kitchen" and "cupboard."

In the above embodiment, a dictionary may be constructed by pre-scanning a training dataset (i.e., a plurality of preprocessed documents) to build up a vocabulary of terms. The system may determine the absolute frequency of each term and may organize the terms in the dictionary via relative frequency.

The system may perform other preprocessing depending on metadata type. For example, categorical data that can take on one of a limited number of possible values (e.g., document owner, document type, etc.) may be transformed into a vector via one-hot encoding, integer encoding, or other transformation methods. As another example, metadata relating to document size may not require preprocessing because such parameter is already a numerical value author.

As yet another example, metadata relating to a date, such as document creation and/or modification dates, may be normalized during preprocessing. In one embodiment, the system may determine an amount of time (e.g., a number of days) from a fixed date (e.g., Jan. 1, 1970) to the given date. That is, a metadata date value may be converted to an integer value by subtracting a fixed date therefrom.

At step 320 metadata features are generated for the preprocessed metadata. Generally, each metadata feature may comprise a numerical representation of document metadata, such as an N-dimensional vector of numerical features representing the metadata. In the case of natural language metadata, 'N' may correspond to the number of unique words or "tokens." In such case, the numerical features may comprise a determined number of occurrences of a given token in the respective metadata.

In one embodiment relating to natural language metadata, each token in the preprocessed metadata may be mapped to a unique ID, for example, via use of a dictionary comprising a vocabulary of terms, each associated with unique ID. Once unique IDs have been assigned to all of the tokens in the preprocessed metadata, the number of occurrences of each token may be recorded to create a vector representing the metadata (e.g., a bag-of-words ("BOW") numerical vector).

At step 325, the metadata features may be stored in a datastore and associated with the data record corresponding to the document from which the feature was determined. And at step 330, the system may transmit and/or display some or all of the metadata scan results via one or more client applications and/or APIs. For example, the metadata features may be provided to the personal information prediction machine learning model so that it may predict whether certain documents contain personal information.

As an experiment, the described personal information prediction system was tested on a dataset comprising 5 folders with about 3,000 documents of different document types (e.g., HTML, MICROSOFT WORD, CSV, PDF, etc.). The dataset was constructed such that the presence of personal information in a document—specifically, an email address—followed a pattern. For example, all the CSV files in folder 'declaration_form' contained an email address, while all the text files did not.

A sample scan was first performed on a training subset comprising about 300 documents (about 10% of the documents in the dataset). For each of the training documents, a regex search was run to determine whether an email address was present and the sample scan results were associated with a data record corresponding to the given document.

A metadata scan was then performed for each of the training documents. Specifically, metadata associated with each training document, including document path, document name and document size was ingested. The ingested metadata was preprocessed and vectorized, as explained above, and the metadata features were associated with the corresponding data records.

The training data records were then used to train a machine learning system employing a random forest model. The metadata features were used as the only features of the machine learning model and the presence of personal information was the target variable.

Once the machine learning system was trained, a metadata scan was performed on the remaining documents (i.e., the prediction subset). The metadata for each document in the prediction subset was ingested, preprocessed and vectorized, as explained above, and the metadata features were associated with corresponding data records. The trained machine learning model was then employed to predict whether the documents in the prediction subset contained personal information, without using any information relating to document content. Remarkably, the model achieved a 100% recall score (i.e., no false negatives) while reaching a very high precision (98%).

To verify the above results, the personal information prediction system was next tested on data retrieved from multiple organizations. The data comprised about 150,000 documents stored in an Amazon Simple Storage Service (S3) file system.

A sample scan was first performed on a training subset comprising about 15,000 documents (e.g., about 10% of the documents in the dataset). A determination as to whether an IP address (IPv4) was present in the training documents was made and the results were associated with data records corresponding to the documents.

A metadata scan was then performed for each of the training documents. Specifically, metadata associated with each training document, including document path, document name and document size, was ingested. The ingested metadata was preprocessed and vectorized, as explained above, and the metadata features were associated with the corresponding data records.

The training data records were then used to train a machine learning system employing a random forest model. The metadata features were used as the only features of the machine learning model and the presence of personal information was the target variable.

Once the machine learning system was trained, a metadata scan was performed on the remaining documents (i.e., the prediction subset). Metadata for each document in the prediction subset was ingested, preprocessed and vectorized, as explained above, and the metadata features were associated with corresponding data records. The trained machine learning model was then employed to predict whether the documents in the prediction subset contained personal information (i.e., an IP address), based only on the metadata features.

As shown in Table 1, below, the personal information prediction system achieved a very high overall accuracy for IP address predictions based solely on document metadata.

TABLE 1

Prediction Results for Amazon S3 File System

| Prediction | Precision | Recall | $F_1$ Score | Support |
|---|---|---|---|---|
| No IP Address | 1.00 | 0.99 | 0.99 | 124,772 |
| IP Address Present | 0.95 | 0.98 | 0.96 | 23,372 |
| Weighted Avg. | 0.99 | 0.99 | 0.99 | 148,144 |

Figure 4:
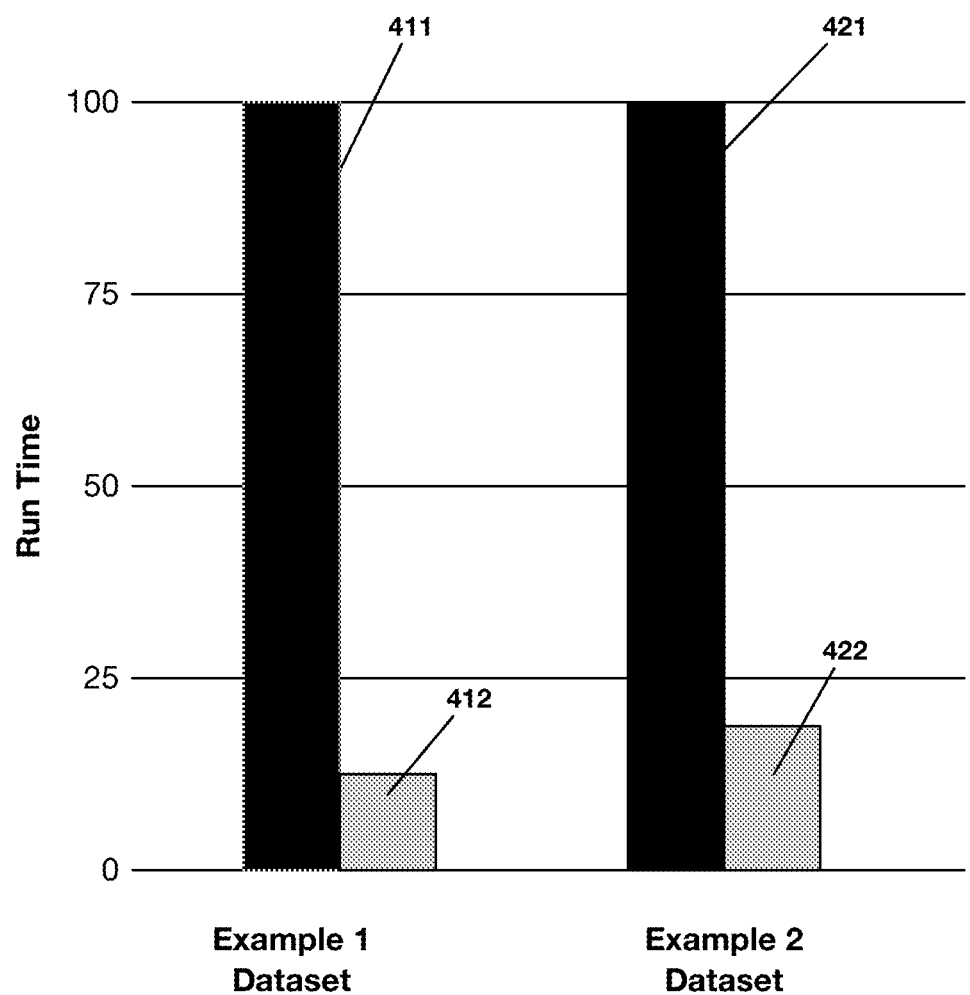
FIG. 4 shows exemplary graphical results relating to run times of personal information prediction systems.

Referring to FIG. 4, exemplary graphical results relating to run times of personal information prediction systems are illustrated. As shown, sample scan with metadata scan 412 was significantly faster than a full scan 411 in predicting personal information presence in the test dataset discussed in the first example, above. Similarly, sample scan with metadata scan 422 was significantly faster than a full scan 421 in predicting personal information presence in the Amazon S3 dataset discussed in the second example, above.

As another test, the personal information prediction methods were employed on data stored in a Hadoop File System ("HDFS") with an attribute correlated to data source fields. As shown in Table 2, below, the personal information prediction system again reached very high accuracy scores. Indeed, Table 2 shows that the prediction system is capable of handling correlation of personal information, in addition to classification thereof.

TABLE 2

Prediction Results for HDFS with Entity-Source-Correlated Attribute

| Prediction | Precision | Recall | $F_1$ Score | Support |
|---|---|---|---|---|
| No Attribute | 1.00 | 0.97 | 0.98 | 189,823 |
| Attribute | 0.94 | 0.99 | 0.96 | 78,415 |
| Weighted Avg. | 0.98 | 0.98 | 0.98 | 268,238 |

It will be appreciated that, in order to achieve accurate results with respect entity-source-correlated attributes, the entire entity source should be loaded and correlated against data source fields. Moreover, for best results, such scans should contain multiple entities in each scanned document.

System Architecture

Figure 5:
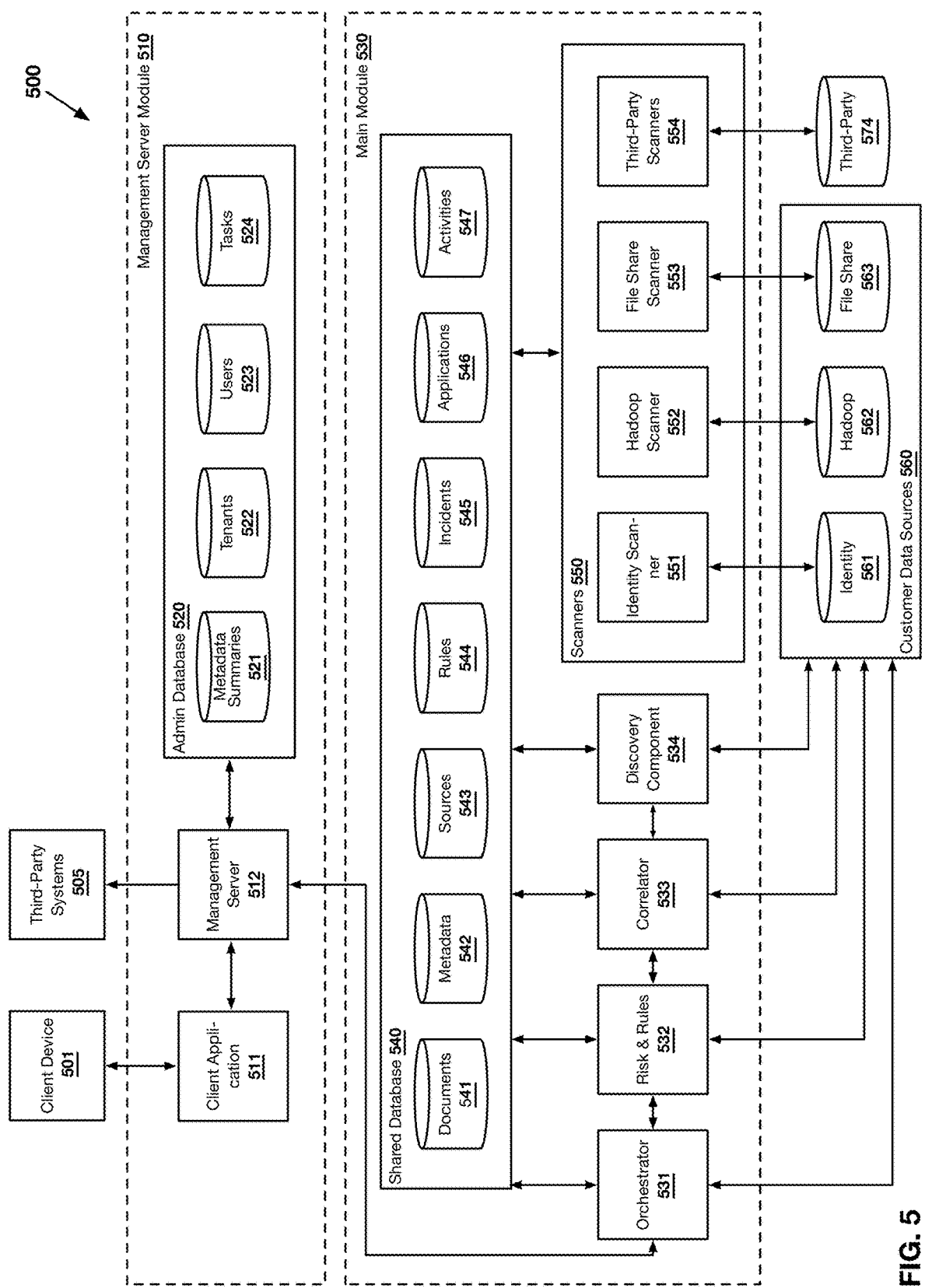
FIG. 5 shows an exemplary system according to an embodiment.

Referring to FIG. 5, an exemplary system 500 is illustrated. As shown, the system may comprise a microservices architecture that can be deployed from a public cloud or inside an organization's data center. This architecture allows the system to be deployed as a simple, single-server deployment or as a multitier, hybrid cloud environment comprising one or more on-premise and/or cloud-based applications.

The core system components may be designed as microservices that may be packaged in containers (e.g., DOCKER containers) to facilitate scalability and to allow flexible deployments. When components are decoupled and can each run in their own isolated environment, it is possible to scale the system by adding more instances of relevant microservices. The container images can be managed, version controlled and downloaded from a container hub, or loaded from compressed files in case the organization's environment does not allow hub access. Generally, each of the components may communicate via a REST API (or a message queue for asynchronous jobs), and most services may be stateless. It will be appreciated that it is possible for several microservices to share the same container.

Although the system may employ a container service, the core deliverables may still be maintained in plain code (e.g., JavaScript, Java, etc.). Accordingly, the components can be packaged in different virtual machine images or even installed by an installer, if desired or required.

As shown, the system may comprise any number of modules, including but not limited to, a management server module 510, which can be deployed either in the cloud or on-premise; and a main module 530 which is typically deployed locally. In one embodiment, the main module 530 comprises a number of components, such as a shared database component 540, an orchestrator component 531, a correlator component 533, a risk analysis and rules evaluation component 532, a data source discovery component 534, and a number of scanner worker components 550 (e.g., an identity scanner 551, a Hadoop scanner 552, a file share scanner 553, and/or a third-party system scanner 554).

The shared database component 540 may store information in a number of database tables (541-547), such as: a documents table 541, a metadata table 542, a data sources table 543, a rules table 544, an incidents table 545, an applications table 546 and/or an activities table 547. As shown various components and/or microservices may access the shared database component 540 to store and/or retrieve information.

In certain embodiments, a data source discovery component 534 may be employed. The discovery component may be adapted to search for available data sources (e.g., using network discovery). Data source information associated with found data sources may be stored in the shared database 540 (e.g., in the data sources table 543).

As shown, the system may comprise a number of distributed, on-premise scanner worker components 550 that are adapted to scan for and retrieve documents from various data sources 560. As discussed above, exemplary document findings may include a document type, a document content and/or link, location information and/or a scanner ID. The scan results may also include document metadata.

The various scanners may connect to an organization's data source(s) 560 in order to find documents, as discussed above. In certain embodiments, the scanner(s) 550 may expose an API to: start the scan, check status, and/or retrieve results relating to documents. The scanner(s) 550 may submit a job to run a scan based on values in an input file. And such scanners may store results in the shared database 540 via the API.

In certain embodiments, the system may integrate with third-party systems and applications, such as data protection systems. A third-party scanner 554 may be employed to retrieve documents from a database 574 relating to such third-party systems. Additionally or alternatively, the system may expose an API for third-party systems 505 and applications to query stored data and/or metadata.

Generally, the system may be configured to scan multiple data sources 560 of multiple types (e.g. Identity data sources 561, Hadoop data sources 562, file share data sources 563, and so on). In one embodiment, each type of data source (561-563) may be scanned by a scanner (551-553) specifically adapted to scan that type of data source. In other embodiments, a single scanner may be employed to scan multiple types of data sources. Each of the scanners 550 may leverage the target data source's 560 native search capabilities and/or may run as part of the data source. For example, a Hadoop scanner 552 may run a MapR job to scan a Hadoop data source 562.

Scalability may be achieved by adding more instances of a given scanner, where each scanner can pick up a scanning job and run in parallel to other scanners. Each scanner instance may check the shared database to see whether there are pending jobs ("scanning tasks") for it to take. And, when a scanning task exists, an appropriate scanner may be automatically triggered to perform the scan.

For some scanners 550, it may be desirable to achieve parallelism by splitting the work into separate scans. For example each type of document may be separated to a different scan (e.g., a first scan may search for a first type of document and a second scan may search for a second type of document). As another example, scans may be separated by alphabetical splitting (e.g., a first scan may search for documents beginning with letters a-f and a second scan may search for documents beginning with letters g-z). For certain scanners the system's native parallelism may be exploited.

In one embodiment, the system may comprise an orchestrator component 531 adapted to call and coordinate separate handlers and/or microservices. For example, the orchestrator component may interact with scanner components 550, the correlator 533, the risk and rules component 532, data sources 560, the shared database component 540 and/or the management server component 512. Generally, the orchestrator component 531 receives information relating to a data subject's personal information and prepares the information for the scanners 550 (e.g., via input files). It may also trigger the scanners and, upon completion, retrieve the results and transmit the same to the shared database component with additional metadata.

The orchestrator component 531 may be responsible for one or more of the following: providing configuration data for the scanners 550 (via input from a user); scheduling the scans, refreshes etc.; executing correlation logic; executing rule evaluation and generating violations; and/or running business information processing (e.g. summary, aggregation, etc. required for user interface screens). In certain embodiments, the orchestrator 531 may generate metadata summaries and/or upload the same to the management server component 512. The orchestrator component 531 can also run further processing, such as risk calculations and compliance determinations.

An exemplary orchestrator workflow may include the following steps: (1) run scan of data source(s); (2) check when finished; (3) prepare a given scanner launch by retrieving, from the correlator component 533, a list of documents to scan and creating an input file with the document information; (4) run the given scanner 550 with the input file; (5) determine that the scanner has completed the scan; and (6) call the correlator component to review the scan results. Depending on specific requirements and/or constraints of any of the scanners, results may be written directly to the shared database 540 such that the orchestrator component 531 can read the results directly when the scan is complete.

The correlator component 533 may be employed to pre-process documents and/or document metadata documents according to the above described processes. It will be appreciated that documents may include sensitive values. Where possible, the system may only store hashed pointers to documents. Where not possible, all temporary data may be wiped.

In certain embodiments, the system may further comprise a risk and rules component 532 that provides activity information relating to data sources 560, including but not limited to, applications, accounts, and/or personal information records that are used or accessed. Such activity data may be determined via STEM, digital asset management ("DAM") and/or cloud access security broker ("CASB") products. And such data may be stored in the shared database (e.g., in the activities table 547).

Still referring to FIG. 5, the system further comprises a cloud-based management server module 510. This module comprises a number of components, including an administrative database component 520, a management server 512, and a client application component 511.

The administrative database component 520 may store information in a number of database tables (521-524), such as a metadata summaries table 521, a tenants information table 522, a users table 523 and/or a tasks table 524. As shown various components and/or microservices may access the administrative database component 520 to store and/or retrieve information.

The system may further comprise a client application 511 to display information in graphical format to any number of users. The client application 511 may comprise a multi-tenant, web-based application (e.g., using AngularJS) that runs on a web browser of a client device 501. The client application may allow for the creation and viewing of documents and/or document information (e.g., document metadata) through the remote management of the on-premise elements of the different tenants. The client application 511 may comprise a SaaS distributed application packaged in containers and remotely hosted to allow simple porting to be delivered as an on-premise, private-cloud application.

In certain embodiments, a user may access the client application to perform customer registration activities. For example, the client application may allow the user to download and register on-premise elements; setup and manage personal information discovery tasks; perform software updates to self-service elements; monitor system health; and/or access any user interface screens of the platform.

Although not shown, in certain embodiments, an analytics and configuration component may be employed to provide the backend for an API consumed by one or more user interface screens of the client application. This component may send instructions to the main module 530 by adding activities, such as activities polled by the main module.

Embodiments of the subject matter and the functional operations described in this specification can be implemented in one or more of the following: digital electronic circuitry; tangibly embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a front end component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method of predicting personal information presence in unstructured data, the method comprising:
   receiving, for each of a plurality of documents associated with unstructured data and stored in a data source, metadata information comprising a plurality of metadata items, the metadata items comprising a document path and a document name;
   preprocessing, for each of the documents, the respective metadata information to generate preprocessed metadata, said preprocessing comprising:
      for each metadata item of the plurality of metadata items:
         normalizing the metadata item to generate a normalized metadata item; and
         tokenizing the normalized metadata item to generate a tokenized metadata item comprising a plurality of tokens;
   creating, for each of the documents, metadata features based on the respective preprocessed metadata, said creating comprising:
      calculating, for each of the tokenized metadata items, a total number of occurrences of each token of the plurality of tokens;
   creating, for each of the documents, a data record comprising the respective metadata features;
   providing the data records to a trained machine learning system that has previously been trained with training data to determine personal information predictions based only on the metadata features of the data records, each personal information prediction relating to a probability that a document associated with a given data record contains personal information;
   receiving, from the trained machine learning system, a personal information prediction for each of the documents; and
   displaying the personal information predictions.

2. A computer-implemented method according to claim 1, wherein said normalizing comprises removing one or more predefined characters from the metadata item.

3. A computer-implemented method according to claim 1, wherein said normalizing comprises transforming the metadata item to lowercase.

4. A computer-implemented method according to claim 1, wherein said tokenizing comprises inferring positions of spaces and splitting the normalized metadata into words at each of the inferred positions.

5. A computer-implemented method according to claim 4, wherein said inferring comprises:
   creating a plurality of potential word combinations from the metadata item, each potential word combination comprising only words for which an entry exists in a dictionary;
   determining a total cost of each of the potential word combinations; and
   selecting an optimal word combination from the potential word combinations based on a comparison of the determined total costs.

6. A computer-implemented method according to claim 5, wherein the dictionary comprises a plurality of entries, each entry comprising a valid word associated with a relative frequency of use.

7. A computer-implemented method according to claim 4, wherein said tokenizing further comprises: removing one or more predefined words from the words and/or reducing at least one of the words to its respective root.

8. A computer-implemented method according to claim 1, wherein the metadata items further comprise at least one of: a document description, a document title and document keywords.

9. A computer-implemented method according to claim 1, wherein the metadata features for each of the documents further comprise a feature relating to one of: a document creation date, a document modification date, a document size, a document type, a document author and a document owner.

10. The computer-implemented method of claim 1, further comprising:
    determining that the probability associated with the personal information prediction relating a document is greater than a predetermined threshold; and
    classifying the document as containing personal information, based on the said determining.

11. A computer-implemented method according to claim 1, wherein each of the personal information predictions relates to a probability that a document associated with a given data record contains a particular personal information attribute.

12. A computer-implemented method according to claim 11, wherein the particular personal information attribute is selected from the group consisting of: an email address, an IP address, a social security number and a zip code.

13. A non-transitory machine-readable medium having program instructions stored thereon, the instructions capable of execution by a processor and defining the steps of:
    receiving, for each of a plurality of documents associated with unstructured data and stored in a data source, metadata information comprising a plurality of metadata items, the metadata items comprising a document path and a document name;

preprocessing, for each of the documents, the respective metadata information to generate preprocessed metadata, said preprocessing comprising:
  for each metadata item of the plurality of metadata items:
    normalizing the metadata item to generate a normalized metadata item; and
    tokenizing the normalized metadata item to generate a tokenized metadata item comprising a plurality of tokens;
creating, for each of the documents, metadata features based on the respective preprocessed metadata, said creating comprising:
  calculating, for each of the tokenized metadata items, a total number of occurrences of each token of the plurality of tokens;
creating, for each of the documents, a data record comprising the respective metadata features;
providing the data records to a trained machine learning system that has previously been trained with training data to determine personal information predictions based only on the metadata features of the data records, each personal information prediction relating to a probability that a document associated with a given data record contains personal information;
receiving, from the trained machine learning system, a personal information prediction for each of the documents; and
displaying the personal information predictions.

14. A non-transitory machine-readable medium according to claim 13, wherein said normalizing comprises removing one or more predefined characters from the metadata item.

15. A non-transitory machine-readable medium according to claim 13, wherein said normalizing comprises transforming the metadata item to lowercase.

16. A non-transitory machine-readable medium according to claim 13, wherein said tokenizing comprises inferring positions of spaces and splitting the normalized metadata into words at each of the inferred positions.

17. A non-transitory machine-readable medium according to claim 16, wherein said inferring comprises:
  creating a plurality of potential word combinations from the metadata item, each potential word combination comprising only words for which an entry exists in a dictionary;
  determining a total cost of each of the potential word combinations; and
  selecting an optimal word combination from the potential word combinations based on a comparison of the determined total costs.

18. A non-transitory machine-readable medium according to claim 13, wherein the metadata items further comprise at least one of: a document description, a document title and document keywords.

19. A non-transitory machine-readable medium according to claim 13, wherein the metadata features for each of the documents further comprise a feature relating to one of: a document creation date, a document modification date, a document size, a document type, a document author and a document owner.

20. A non-transitory machine-readable medium according to claim 13, wherein each of the personal information predictions relates to a probability that a document associated with a given data record contains a particular personal information attribute.

* * * * *